3,301,427
CONTAINER AND A LID THEREFOR, AND MEANS FOR DETACHABLY SECURING SAID LID TO SAID CONTAINER
Harold Roman, Wilmette, Ill.
(841 W. Washington Blvd., Chicago, Ill. 60607)
Filed May 28, 1965, Ser. No. 459,594
11 Claims. (Cl. 215—89)

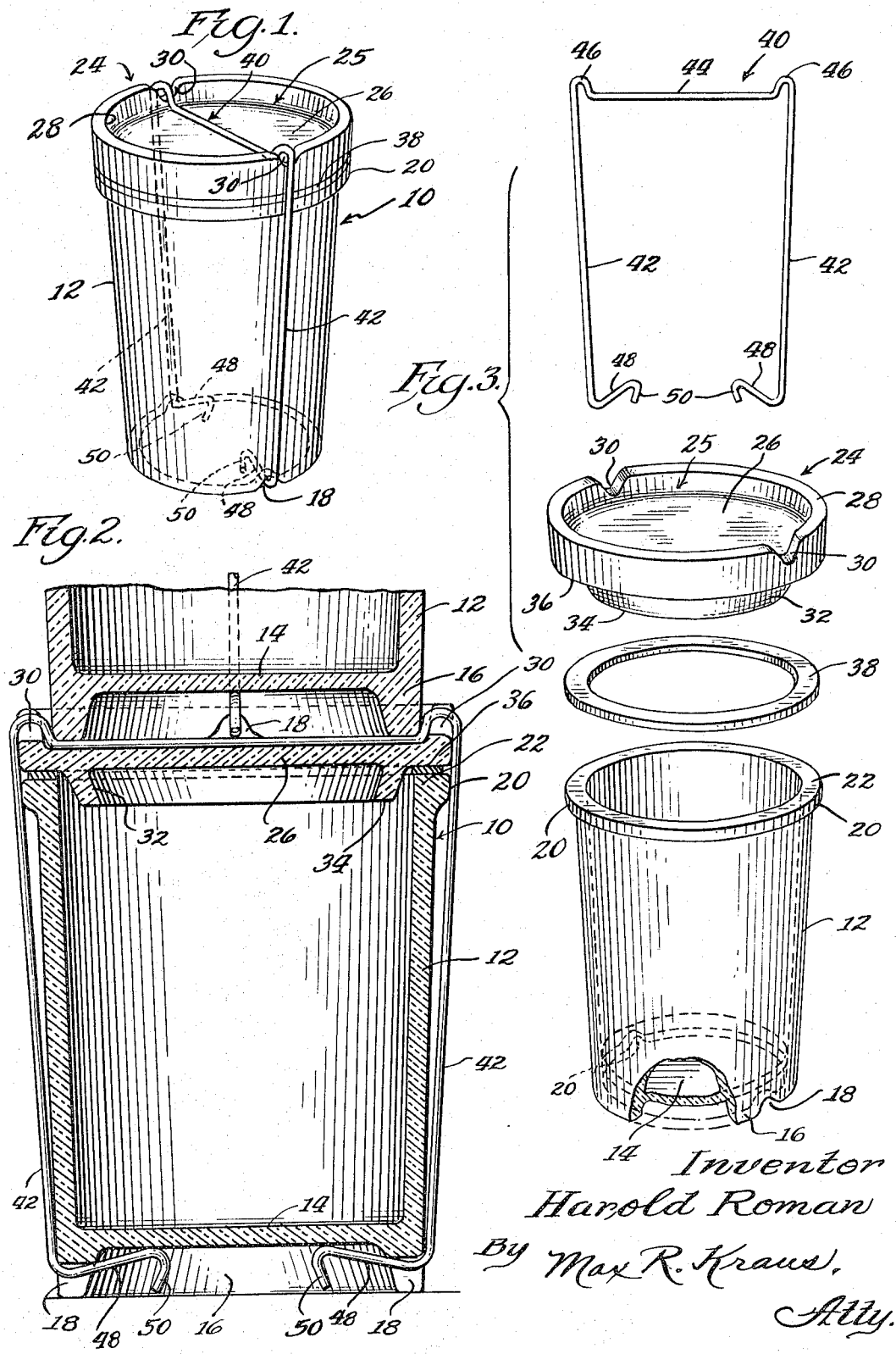

This invention relates to a container and a lid therefor, and means for detachably securing said lid to said container.

One of the objects of this invention is to provide a container and a lid therefor for closing and sealing said container and wherein the lid is secured to said container by means of a wire member which may be readily attached to and detached from said container and lid.

Another object of this invention is to provide a jar and lid therefor made of earthenware, which holds a product which is to be sealed, such as cheese, butter, and the like.

Another object of this invention is to provide a jar and cover therefor, and means for detachably securing said cover to said jar, and providing a construction in which the jars may be stacked one on top of the other in a nesting relationship on the shelves in a store or wherever placed, and wherein the nesting relationship will prevent accidental dislodgement between the jars.

Another object of this invention is to provide a lid or cover which may also be used as a coaster or ash tray.

Other objects will become apparent as this description progresses.

In the drawings:

FIG. 1 is a perspective view of this invention.

FIG. 2 is an enlarged sectional view taken along the center and also showing the positioning of another container thereon.

FIG. 3 is an exploded perspective view of the parts forming this invention.

The jar or container is generally designated by the numeral 10 and comprises a cylindrical-shaped body 12 which inclines generally or slopes inwardly from the top towards the bottom end. The horizontal bottom wall 14 of the container is spaced upwardly from the bottom edge of the body 12. The wall forming the cylindrical body 12 extends to the bottom edge and the wall portion 16 below the horizontal bottom 14 may be considered as the skirt portion. The skirt portion 16 is provided with a pair of diametrically oppositely spaced inverted V-shaped recesses 18.

The upper portion of the body adjacent the rim is enlarged to provide an annular enlargement or bead 20. The rim 22 has a flat top surface.

The lid or cover 24 has an upper surface which is shaped to provide a circular well generally indicated at 25 which comprises a horizontal flat top wall 26 bounded by an upwardly extending annular ring or rim 28 formed integrally therewith. The rim or ring 28 is provided with a pair of oppositely and diametrically spaced generally V-shaped cutouts or recesses 30. Depending from the horizontal top wall 26 is a depending annular flange 32 which is inclined or tapers inwardly, as best shown in FIG. 2, and is provided with a flat bottom 34. The undersurface 36 of the lid which is adapted to rest on the gasket or ring is also flat. The flange 32 keeps the lid from being pushed off the top of the container.

An annular gasket or ring 38 formed of resilient material is positioned on the top of the flat rim 22 of the container. The lid 24 is positioned on the top of the container so that the flat undersurface 36 thereof rests on the gasket 38, with the downwardly depending flange 32 extending within the upper portion of the container or jar, as best shown in FIG. 2.

To secure the lid 24 to the container there is provided a wire clamping member generally indicated at 40, which is formed preferably of a single piece of spring steel wire bent to the shape best shown in FIG. 3. The wire clamping member is of a generally inverted U-shaped configuration having a pair of spaced sides 42 connected across the top by a horizontal top portion 44. The sides 42 are bent at their upper ends to form reverse bends 46. The lower ends of the sides 42 are each bent inwardly and upwardly at an inclined angle to form hooking members 48 which terminate in downwardly extending ends 50.

With the lid 24 positioned on the jar or container, the wire clamping member 40 is positioned so that the top portion 44 thereof extends across and engages the top of the lid, with the bends 46 thereof engaging in the recesses 30 of the lid and the sides 42 adjacent the body 12, with the hooking members 48 engaging in the recesses 18 in the bottom of the container, all as shown in FIG. 1.

As best seen in FIG. 2, when the hooking members 48 engage in the bottom of the container or jar they are positioned above the bottom of the skirt 16. This is important as when these jars or containers are arranged in superimposed stacked position, the skirt portion 16 of the container can be positioned within the circular well 25 of the lid of the next adjacent lower container, and the hooking members 48 of the upper container will not interfere with the lid or the top portion 44 of the clamping member of the lower container.

The wire clamping member 40 is preferably coated with a plastic covering to enhance its appearance and to eliminate any rough surfaces or sharp edges on the wire, thereby preventing injury to the user.

With this invention, the lid is readily secured to the jar and retained in a locked and seal-tight relationship therewith by means of the wire clamping member, however, the lid may be removed by snapping out the hooking ends 48 from the bottom and releasing the lid. The jars may be supported on the shelf in a store or at home in a stacked arrangement, one above the other wherein there is a nesting relationship between the jars to prevent their being pushed off in relation to each other or being accidentally displaced. When the lid is no longer used as a cover for the container it can form a coaster or be used as an ash tray, and the depending flange 32 of the lid forms the bottom therefor. When used as an ash tray the recesses 30 can serve to hold or retain burning cigarettes.

It will be understood that various changes and modifications may be made from the foregoing without departing from the spirit and scope of the appended claims.

What is claimed is:

1. A device of the character described comprising a container, a lid for said container, said lid having a circular well configuration comprising a top wall and a circular upstanding rim, with said rim having opposed recesses extending below the top of said rim, a wire clamping member of a generally inverted U-shaped configuration adapted to engage in the recesses in the rim of said lid, said clamping member having hooking means at its opposite ends adapted to engage the bottom of said container for holding said lid in a closed position on said container.

2. A structure defined in claim 1 in which the clamping member has spaced sides and in which the hooking means at the opposite end of each of the sides is above the bottom plane of the sides of the clamping member.

3. A structure defined in claim 2 in which the bottom of the container is provided with spaced recesses which are engaged by the clamping member.

4. A structure of the character described comprising a container having a body portion and a bottom wall elevated from the bottom of said body portion so that a skirt extends below said bottom wall, a pair of oppositely positioned recesses in said skirt, a lid having an annular rim and a horizontal surface positioned below the top of said rim to provide a well, said rim having a pair of oppositely spaced recesses, a clamping member adapted to detachably secure said lid to said container, said clamping member having means engaging said recesses in said lid and skirt to secure said lid to said container.

5. A structure defined in claim 4 in which the clamping member is formed of a single wire bent to form a generally inverted U-shaped configuration with inwardly turned hooking means adjacent the lower end thereof.

6. A structure defined in claim 4 in which a rubber gasket is positioned between the top of the container and the lid.

7. A structure defined in claim 5 in which the wire clamping member is coated with a plastic coating.

8. A structure defined in claim 4 in which the well of the lid receives the bottom of another container positioned in a superimposed and stacked relationship.

9. A structure defined in claim 1 in which the well of the lid receives the bottom of another container positioned in a superimposed and stacked relationship.

10. A structure defined in claim 4 in which the lid has a depending flange.

11. A structure defined in claim 1 in which the container is formed of earthenware.

References Cited by the Examiner

UNITED STATES PATENTS

| | | | |
|---|---|---|---|
| 536,869 | 4/1895 | Gilbert | 215—89 |
| 575,967 | 1/1897 | Miracle | 215—91 |
| 640,897 | 1/1900 | Fowler | 215—81 |
| 749,674 | 1/1904 | Hoffman | 215—91 |
| 2,281,433 | 4/1942 | Gunn | 215—91 |

FRANKLIN T. GARRETT, *Primary Examiner.*